US009573698B1

(12) United States Patent
He

(10) Patent No.: US 9,573,698 B1
(45) Date of Patent: Feb. 21, 2017

(54) FLIGHT DECK DISPLAY SYSTEMS AND METHODS FOR GENERATING COCKPIT DISPLAYS INCLUDING DYNAMICALLY-ADJUSTED USABLE RUNWAY LENGTH SYMBOLOGY

(71) Applicant: HONEYWELL INTERNATIONAL INC., Morristown, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/820,287

(22) Filed: Aug. 6, 2015

(51) Int. Cl.
*B64D 43/00* (2006.01)
*B64D 45/08* (2006.01)
*G08G 5/00* (2006.01)

(52) U.S. Cl.
CPC .............. *B64D 43/00* (2013.01); *B64D 45/08* (2013.01); *G08G 5/0065* (2013.01)

(58) Field of Classification Search
None
See application file for complete search history.

(56) References Cited

U.S. PATENT DOCUMENTS

| | | |
|---|---|---|
| 5,499,025 A | 3/1996 | Middleton et al. |
| 7,085,630 B2 | 8/2006 | Ryan et al. |
| 7,852,236 B2 | 12/2010 | Feyereisen et al. |
| 7,908,078 B2 | 3/2011 | He |
| 7,965,223 B1 | 6/2011 | McCusker |
| 8,193,948 B1 | 6/2012 | Shapiro et al. |
| 8,200,378 B1 | 6/2012 | Chiew et al. |
| 8,249,806 B1 | 8/2012 | McCusker |
| 8,396,616 B1 | 3/2013 | Barber et al. |
| 8,441,376 B1 | 5/2013 | Tsai et al. |
| 8,462,019 B1 | 6/2013 | vanDerKamp et al. |
| 8,560,150 B1 * | 10/2013 | Phillips .................. B64D 45/08 303/126 |

(Continued)

OTHER PUBLICATIONS

NBAA Nation Business Aviation Association; Pilots Reminded to Observe New ATC Phraseology; Dec. 5, 2011.

(Continued)

*Primary Examiner* — John R Olszewski
*Assistant Examiner* — James M McPherson
(74) *Attorney, Agent, or Firm* — Lorenz & Kopf, LLP

(57) ABSTRACT

Flight deck display systems and methods for generating cockpit displays including dynamically-adjustable runway length symbology are provided. In one embodiment, the flight deck display system includes a display device to which a controller is operably coupled. A cockpit display, such as a primary fight display, is generated on the display device. The cockpit display is generated to include a runway graphic and a usable runway end marker. During operation of the display system, the controller receives runway usage restriction data identifying any currently restricted sections of a runway approached for usage by the aircraft. The controller further determines a dynamically-adjusted usable runway length as a function of the runway usage restriction data and then adjusts the position of the usable runway end marker, as generated on the cockpit display, along the length of the runway graphic in accordance with the dynamically-adjusted usable runway length.

19 Claims, 5 Drawing Sheets

(56) References Cited

U.S. PATENT DOCUMENTS

| | | | |
|---|---|---|---|
| 8,594,916 B2 | 11/2013 | He | |
| 8,711,007 B2 | 4/2014 | Chen et al. | |
| 8,773,289 B2* | 7/2014 | Maggiore | G08G 5/0008 340/425.5 |
| 9,014,881 B2 | 4/2015 | DeGagne et al. | |
| 2004/0044446 A1* | 3/2004 | Staggs | G08G 5/025 701/16 |
| 2011/0304479 A1* | 12/2011 | Chen | G08G 5/0021 340/951 |
| 2012/0209458 A1 | 8/2012 | Sampath | |
| 2013/0278444 A1 | 10/2013 | Venkataswamy et al. | |
| 2014/0257601 A1 | 9/2014 | Horne et al. | |
| 2014/0257603 A1 | 9/2014 | McKeown et al. | |
| 2015/0120098 A1 | 4/2015 | Catalfamo et al. | |
| 2015/0127196 A1 | 5/2015 | Ishihara et al. | |
| 2015/0239577 A1* | 8/2015 | Lowe | B64F 1/00 244/114 R |

OTHER PUBLICATIONS

Gaël Le Bris; Safety of the Runway Operations With a Temporary Displaced Threshold During Construction Works, Nov. 15, 2013; TRB 2014 Annual Meeting.

Jenkins, M.; Reducing Runway Landing Overruns; WWW.boeing.com/BoeingEdge/aeromagazine, 2012.

\* cited by examiner

FLIGHT DECK DISPLAY SYSTEMS AND METHODS FOR GENERATING COCKPIT DISPLAYS INCLUDING DYNAMICALLY-ADJUSTED USABLE RUNWAY LENGTH SYMBOLOGY

TECHNICAL FIELD

The following disclosure relates generally to flight deck display systems and, more particularly, to flight deck display systems and methods for generating displays including symbology relating to usable runway length, as adjusted dynamically to reflect changing runway use restrictions.

BACKGROUND

A significant fraction of aircraft accidents and incidents arise from runway overrun and veer-off events (collectively referred herein to as "runway excursions"). Runway excursions can occur due to a lack of adequate pilot awareness as to the runway length available for touchdown and rollout during landing or for surpassing a minimum liftoff speed during takeoff (referred to herein as the "usable runway length"). The usable length may be less than the total length of a runway, which often includes other sections into which aircraft encroachment is not permitted, such as blast pads and extended thresholds. For this reason, it can be difficult for a pilot to quickly and accurately discern the location at which the usable length of a particular runway terminates from the cockpit view alone in at least some instances. Further complicating this problem, the usable length of a given runway can change in abrupt and unpredictable manners due to events occurring on the ground. For example, sudden changes in usable runway length can occur when a section of the runway is rendered temporarily or permanently unavailable due to the presence of debris or another contaminant, structural damage and repair, the incursion of another aircraft or ground vehicle into the runway, and the like. In instances wherein usable runway length has been reduced due to a newly-implemented runway usage restriction, a pilot may be unaware of the current usable runway length even if the pilot is familiar with the runway from past experience.

It is thus desirable to provide flight deck display systems and methods for generating cockpit displays including symbology visually conveying the usable length of a runway approached by an aircraft for landing or takeoff purposes. Ideally, embodiments of such a flight deck display system and method would dynamically adjust or modify such symbology to reflect real world runway conditions including any variations in usable runway length resulting from changing runway usage restrictions. It would further be desirable if such systems and methods could generate graded alerts notifying a pilot when the runway length required by the aircraft approaches or exceeds the dynamically-adjusted usable runway length. Other desirable features and characteristics of the present invention will become apparent from the subsequent Detailed Description and the appended Claims, taken in conjunction with the accompanying Drawings and the foregoing Background.

BRIEF SUMMARY

Flight deck display systems for generating cockpit displays including dynamically-adjustable runway length symbology are provided. In one embodiment, the flight deck display system includes a display device to which a controller is operably coupled. A cockpit display, such as a perspective view or primary fight display, is generated on the display device. The cockpit display is generated to include a runway graphic and a usable runway end marker. During operation of the flight deck display system, the controller receives runway usage restriction data identifying any currently restricted sections of a runway approached for usage by the aircraft. The controller determines a dynamically-adjusted usable runway length as a function of the runway usage restriction data and then adjusts the position of the usable runway end marker, as generated on the cockpit display, along the length of the runway graphic in accordance with the dynamically-adjusted usable runway length.

In a further embodiment, the flight deck display system includes a display device and a controller, which is operably coupled to the display device. A Primary Flight Display (PFD) including a runway graphic is generated on the display device. The controller receives runway usage restriction data identifying any currently restricted sections of a runway approached for usage by the aircraft. When the runway usage restriction data identifies a currently restricted runway section, the controller further produces a restricted section graphic visually identifying a portion of the runway graphic corresponding to the currently restricted runway section identified by the runway usage restriction data.

Methods for generating cockpit displays including dynamically-adjusted runway length symbology are further provided. The method can be carried-out by a flight deck display system including a controller and a display device operably coupled to the controller. In one embodiment, the controller receives runway usage restriction data identifying any currently restricted sections of a runway approached for usage by the aircraft. The controller then determines a dynamically-adjusted usable runway length as a function of the runway usage restriction data. A cockpit display including a runway graphic and a usable runway end marker is then generated on the display device. The usable runway end marker is generated to have a position along the length of the runway graphic visually denoting the dynamically-adjusted usable runway length.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
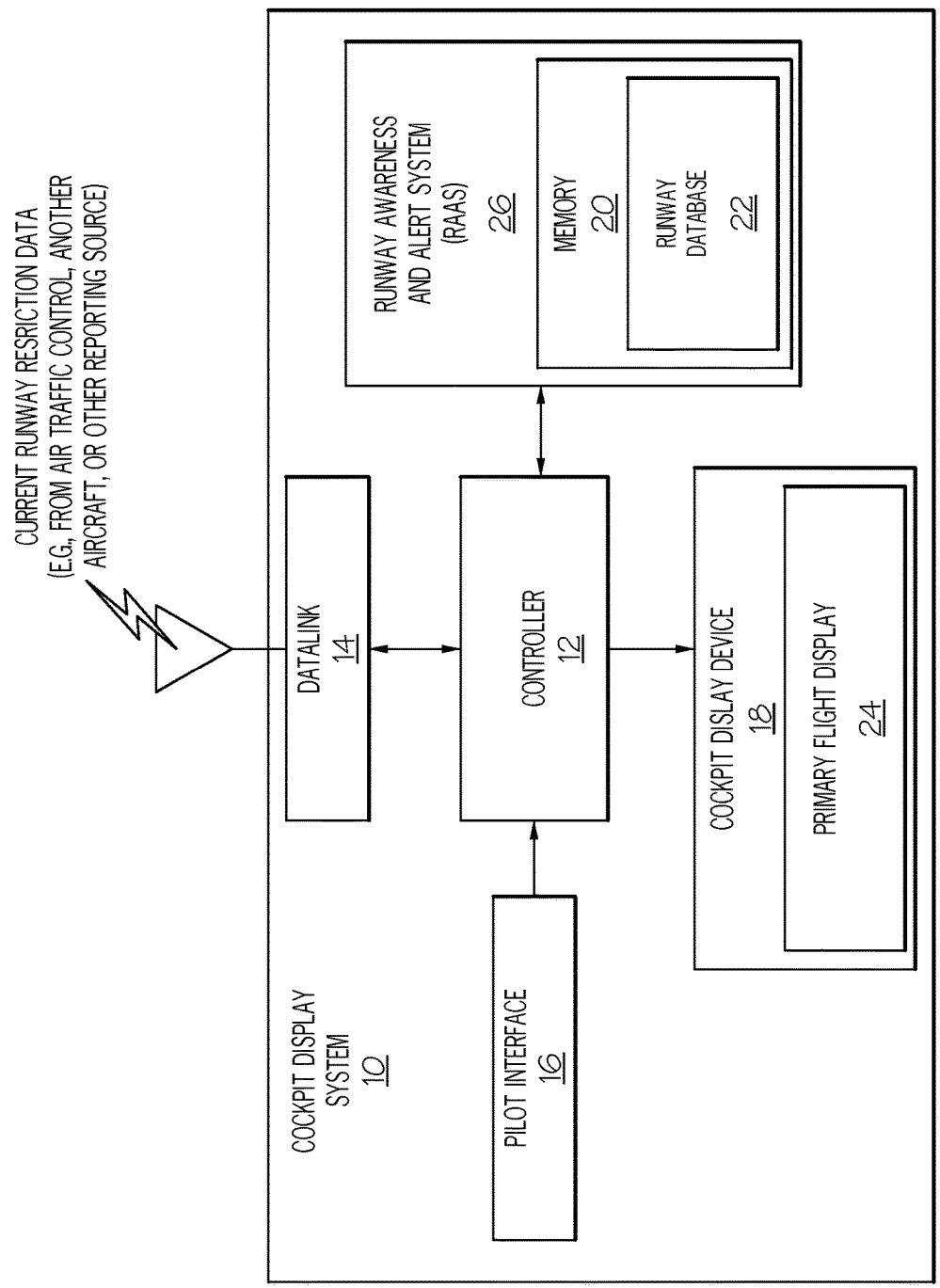
FIG. 1 is a block diagram of a flight deck display system suitable for generating usable runway length symbology adjusted dynamically to reflect temporary and permanent runway use restrictions, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "pilot" encompasses all members of an aircrew. As further appearing herein, the term "cockpit display" refers to a graphical display, such as a Primary Flight Display or other perspective view display, generated on a display device while located in the cockpit of an aircraft. As further appearing herein, the term "cockpit display" refers to an image produced on the screen of an image-generating monitor or display device when operating in the cockpit of an aircraft. A given display can occupy the entire screen of a monitor or, perhaps, a limited portion thereof.

As described in the foregoing section entitled "BACKGROUND," runway excursions are more likely to occur when a pilot is not adequately apprised of the usable length of a runway approached by an aircraft for takeoff or landing purposes. Recently, flight deck display systems have been proposed for generating cockpit displays, such as a Primary Flight Displays (PFDs), including symbology indicating the usable length of a runway approached for usage by an aircraft. An example of such a flight deck display system is described in U.S. Pat. No. 7,908,078 B2 entitled "PERSPECTIVE-VIEW VISUAL RUNWAY AWARENESS AND ADVISORY DISPLAY," issued Mar. 15, 2011, and assigned to the assignee of the present application, Honeywell International Inc., the contents of which are hereby incorporated by reference. Such proposed flight deck systems may calculate the usable length of a given runway utilizing information stored in an onboard database and produce graphics on a cockpit display visually denoting the location at which the usable runway length terminates. This provides a useful visual cue of the runway's usable length, which aids pilot decision making during the takeoff or landing phases of flight (collectively referred to as "runway flight phases"). Such proposed flight deck display systems may not, however, consider dynamic changes in runway length resulting from events occurring on the ground. Thus, in instances wherein a newly-implemented runway restriction reduces the usable length of a runway approached by the aircraft for landing or takeoff purposes, there may occur an undesirable mismatch between the static or fixed usable runway length symbology generated by the display system and the actual or "real world" usable length of the runway.

The following describes embodiments of flight deck display systems and methods for generating cockpit displays including symbology indicative of usable runway length, as adjusted dynamically to reflect any variations resulting from changing runway usage restrictions. During operation, the flight deck display system receives runway usage restriction information or data describing any currently restricted sections of a runway approached for usage by the aircraft. The runway usage restriction data can be received from any number of sources and manually entered into the flight deck display system by a pilot, wirelessly received over a datalink and automatically entered into the display system, or otherwise received and inputted into the display system. The display system then utilizes the runway usage restriction data to determine the dynamically-adjusted usable runway length and modifies the usable runway length symbology generated on the cockpit display in accordance therewith. The usable runway length symbology may include a number of graphic elements, which are continually or periodically modified to reflect changes in the dynamically-adjusted usable runway length. Such graphic elements can include usable runway end marker, countdown markers, and/or selectively-generated restricted section graphics. Furthermore, in some embodiments, the flight deck display system can selectively alter the appearance of the runway usable length symbology to generate visual alerts on the cockpit display when, for example, the runway length required by a particular runway flight phase approaches or exceeds the dynamically-adjusted usable runway length. In this manner, embodiments of the flight deck display system can enhance pilot situational awareness and aid pilot decision making in instances when the usable length of a runway has been altered due to on-the-ground events as they occur. An exemplary embodiment of such a flight deck display system will now be described in conjunction with FIG. 1.

FIG. 1 is a schematic of a flight deck display system 10, as illustrated in accordance with an exemplary embodiment of the present invention. When an aircraft (A/C) carrying display system 10 approaches a runway for landing or takeoff, flight deck display system 10 generates a cockpit display including dynamically-adjusted usable runway length symbology. The usable runway length symbology is "dynamically-adjusted" in the sense that the appearance of graphical elements or symbols included in the symbology is continually or periodically altered to reflect real world conditions impacting usable runway length as such conditions develop and change over time. In certain embodiments, flight deck display system 10 generates the usable runway length symbology on a three dimensional (3D) or perspective view display of the type referred to as a "Primary Flight Display" or, more simply, a "PFD." Furthermore, when the A/C is located on, above, or in close vicinity to an airport surface, the images produced on the PFD may depict an airport and its associated surfaces (runways, taxiways, and the like). In this case, the images of produced on the PFD may be referred to as a 3D "Airport Moving Map" or, more simply, a "3D AMM." While preferably generated on a PFD or a 3D AMM, the possibility that the below-described usable runway length symbology can be generated on a different type of cockpit display, such as a navigational display or two dimensional AMM, is not precluded. Examples of dynamically-adjusted usable runway length symbology that can be generated during operation of flight deck display system 10 are described below in conjunction with FIGS. 2-5. First, however, a general description of the components included within system 10 is provided.

In the exemplary embodiment shown in FIG. 1, flight deck display system 10 includes the following components, each of which may be comprised of multiple devices, systems, or elements: (i) a controller 12, (ii) a datalink 14 coupled to an input and output of controller 12, (iii) a pilot interface 16 coupled to an input of controller 12, (iv) at least one display device 18 coupled to one or more outputs of controller 12, and (v) memory 20 containing a runway database 22 and coupled to an input of controller 12. The various components of display system 10 can be interconnected utilizing any suitable aircraft architecture, which may include physical connections (e.g., provided through an avionic data bus) and/or wireless connections. Controller 12 can be implemented utilizing any suitable number of individual microprocessors, navigational equipment, memories, power supplies, storage devices, interface cards, and other standard components known in the art. Furthermore, the controller 12 may include or cooperate with any number of software programs (e.g., flight deck programs) or instructions designed to carry-out the various methods, process tasks, calculations, and display functions described herein.

In certain embodiments, the current runway usage restriction data can be entered into flight deck display system 10 by a pilot utilizing pilot interface 16. In this regard, pilot interface 16 can be any device or group of devices enabling a pilot to input data into flight deck display system 10, such as various combinations of switches, dials, buttons, keyboards, cursor devices, cameras, microphones, touchscreen devices, and the like. The pilot may obtain the current runway usage restriction data from, for example, a voice broadcast or a digital message, such as a Pilot Information Report (PIREP). It is preferred, however, the current runway usage restriction data is received wirelessly from a remote reporting source via datalink 14 in real-time or near real-time. Datalink 14 can assume any form suitable for receiving wireless signals containing runway usage restriction data from one or more remotely-located data sources. Sources from which datalink 14 may receive runway usage restriction information include, but are not limited to, Air Traffic Control (ATC), airline dispatch, and other aircraft. By way of example, the runway usage restriction data may be extracted from a Pilot Report (PIREP), a digital Notice to Airmen (NOTAM), and/or an Automated Terminal Information Service (ATIS) transmission. As still further possibly, the current runway usage restriction data can be derived by receiving a voice broadcast (e.g., a PIREP received via radio transmission), processing the verbally-conveyed runway conditions information to text (e.g., utilizing a voice-to-text conversion engine), and then supplying the current runway usage restriction data to controller 12 for further processing.

Display device 18 can assume the form of any monitor or image-generating device suitable for producing a cockpit display, such as a PFD, including dynamically-adjusted usable runway length symbology of the type described below. Display device 18 will typically be affixed to the static structure of the A/C and positioned within the aircraft cockpit in either Heads Down Display (HDD) or Heads Up Display (HUD) configuration. However, it is also possible that display device 18 can be worn by a pilot as, for example, a near-to-eye or helmet-mounted display device. In certain embodiments, the screen of display device 18 can be fully or partially transparent, in which case the below-described usable runway length symbology can be superimposed on over the real world view of an runway and its surrounding environment, as seen through the display screen. In still further embodiments, display device 18 can assume the form of a portable electronic display, such as a tablet computer or Electronic Flight Bag (EFB), which is carried into the cockpit by a pilot and which communicates with the aircraft avionics over a physical or wireless connection to perform the below-described functions during A/C operation. As generically indicated in FIG. 1, the cockpit display preferably assumes the form of a PFD 24 generated on display device 18 during operation of flight deck display system 10. As noted above, PFD 24 can be generated in a 3D format, typically from a perspective viewpoint, and may depict a 3D AMM when the A/C is located on, above, or in close vicinity to an airport surface.

With continued reference to the exemplary embodiment shown in FIG. 1, flight deck display system 10 further includes a memory 20 containing a runway database 22. Runway database 22 can be a collection of stored information pertaining to runways, airport layouts, and the like useful in performing the functions described herein. Of particular relevance, runway database 22 can store the locations, lengths, and other such parameters pertaining to runways located within at least the operational range of the aircraft carrying flight deck display system 10 (referred to hereafter as the "ownship A/C"). Runway database 22 may also store other information pertaining to airports and airport layouts, in which case database 22 may also be referred to as "an airport map" database. Runway database 22 can be integrated into any suitable system or subsystem of flight deck display system 10. In embodiments, and as indicated in FIG. 1, runway database 22 is included within a Runway Awareness and Advisory System (RAAS) system 26 providing "Short Runway" alerting functions, as described more fully below. In one embodiment, RAAS 26 is a SMARTRUNWAY® and/or a SMARTLANDING® system developed and commercially marked by the assignee of the present application, Honeywell International Inc., currently headquartered in Morristown, N.J. While controller 12 and RAAS 26 are illustrated as distinct blocks in FIG. 1, it will be appreciated that controller 12 can be integrated into or may be part of RAAS 26 or another aircraft system (e.g., a Flight Management System or Flight Director computer) in actual implementations of flight deck display system 10.

During operation of flight deck display system 10, controller 12 obtains and processes runway usage restriction data, which identifies any currently-restricted sections of a runway approached for usage by the aircraft; the phrase "approached for usage by an aircraft" referring to a runway approached by the aircraft for the purposes of takeoff or landing. Other information, such as information describing the current runway surface conditions or runway braking action, can also be received with the runway usage restriction data. The runway usage restriction data can be received from any suitable source and supplied to controller 12 in a number of different manners. For example, and as previously noted, the runway usage restriction data can be manually entered into controller 12 by a pilot utilizing a pilot interface 16. In preferred embodiments, however, the runway usage restriction data is received in real-time or near real-time over datalink 14 and automatically relayed to controller 12. As further noted above, the runway usage restriction data can be extracted from a PIREP, a digital NOTAM, and/or an ATIS transmission received over datalink 14 or by another communication link. As a further possibility, the runway usage restriction data can be directly communicated to the ownship A/C carrying flight deck display system 10 (FIG. 1) from an aircraft that has recently landed at or taking-off from a runway as, for example, an Automatic Dependent Surveillance Broadcast (ADS-B).

After receiving the runway usage restriction data, controller 12 of flight deck display system 10 utilizes the newly-received runway usage restriction data to determine the current usable length of a runway approached for usage by the ownship A/C. When in appropriate range of the runway, controller 12 generates a PFD or other cockpit display including symbology visually denoting usable runway length. Controller 12 and, more generally, flight deck display system 10 performs the above-described process continually or periodically at a predetermined refresh rate to update the usable runway length symbology to reflect current runway usage restrictions as they develop and change in conjunction with the occurrence of on-the-ground events, such as newly-arising runway usage restrictions. Controller 12 may also generate visual alerts on the PFD or other cockpit display by altering the appearance of the usable runway length symbology when, for example, the runway length required for a runway flight phase is determined to approach or exceed the dynamically-adjusted usable runway length. By way of non-limiting illustration, an exemplary embodiment of the manner in which controller 12 of flight deck display system 10 may generate such usable runway length symbology and visual alerts on a PFD or 3D AMM will now be described in conjunction with FIGS. 2-5.

Figure 2:
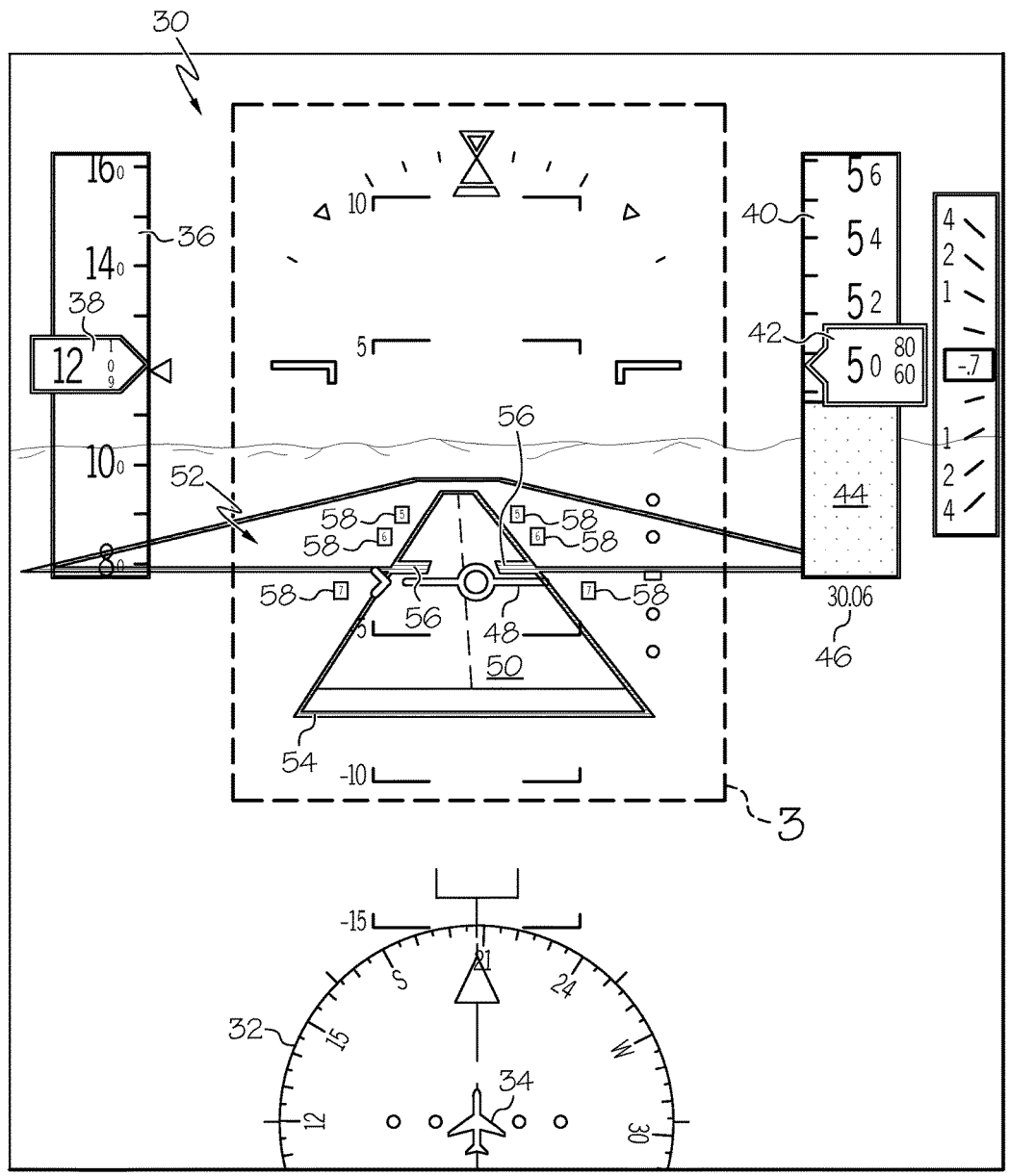
FIG. 2 is a screenshot of an exemplary Primary Flight Display (PFD) generated by the flight deck display system shown in FIG. 1 and including usable runway length symbology, as illustrated in a first exemplary scenario in which an approached runway is free of temporary restrictions.

FIG. 2 is a screenshot of an exemplary PFD 30 generated on display device 18 by controller 12 during operation of flight deck display system 10 (FIG. 1) in accordance with an exemplary and non-limiting embodiment of the present invention. PFD 30 may thus correspond with PFD 24 shown in FIG. 1, although different reference numerals are utilized to emphasize the appearance of the PFD and the usable runway length symbology will vary amongst embodiments. As shown in FIG. 2, PFD 30 is a perspective view Synthetic Vision System (SVS) display including graphical renderings of terrain and other geographical features representing the view from the cockpit under ideal visibility conditions (a so-called "glass cockpit" view). PFD 30 further includes various graphic elements and symbology visually expressing the current flight parameters of the ownship A/C. Many of the graphic elements of PFD 30 are well-known within the avionics industry and will not be described in detail herein. However, for completeness, it is briefly noted that the illustrated PFD 30 contains the following graphic elements: (i) a compass 32 centered about an A/C icon 34 (located in the bottom center of PFD 30); (ii) an airspeed indicator or "airspeed tape" 36, which features a precision readout window 38 (located in the upper left corner of PFD 30); (iii) an altitude indicator or "altitude tape" 40, which features a precision readout window 42 (located in the upper right corner of PFD 30) and a ground filled region 44; (iv) a barometric pressure setting readout 46 (located beneath altitude tape 40); and (v) a flight path vector icon or flight path marker 48, which moves across PFD 30 to reflect changes in the flight path of the ownship A/C.

The ownship A/C is presently approaching a runway at which the aircraft has been cleared to land in the scenario illustrated in FIG. 2. Accordingly, PFD 30 is produced to include a runway graphic 50 representative of the runway approached by the ownship A/C. Concurrently, a number of additional graphical elements 52 relating to the usable length of the runway represented by graphic 50 are also generated on PFD 30. As indicated above, such additional graphic elements are collectively referred to herein as "usable runway length symbology 52." In the illustrated example, usable runway length symbology 52 includes a runway border 54, a touchdown target 56, and a number of countdown markers 58. Runway border 54 can be produced as a relatively thick outline extending around the perimeter of the usable length of runway graphic 50 to help visually distinguish the usable runway length from its surroundings on PFD 30. Touchdown target 56, by comparison, can be Generated as a visual marker (e.g., relatively thick line segments converging inwardly from opposing lateral sides of runway border 54) positioned along the length of runway graphic 50 to denote the location at which the ownship A/C ideally contacts the runway when landing. Finally, countdown markers 58 can be generated to appear as virtual signs, which are positioned alongside the opposing lateral sides of runway graphic 50 at predetermined intervals. Countdown markers 58 simulate real world signage with each laterally-opposed set of markers 58 providing a numerical readout of distance remaining (in thousands of feet) until the far terminal end of the usable runway length is reached.

Additional usable runway length symbology can also be selectively generated on PFD 30 and appear (e.g., gradually fade in) as the ownship A/C approaches the far end of the usable runway length of the runway. For example, a usable runway end marker can be generated adjacent to or superimposed over runway graphic 50 identifying the far end of the usable runway length when the ownship A/C is sufficiently close thereto. Additionally or alternatively, controller 12 of flight deck display system 10 (FIG. 1) can generate runway length usage symbology to further include a restricted section graphic when the runway usage restriction data indicates that one or more sections of the runway are currently restricted in a manner effecting usable runway length. When appearing on PFD 30, the restricted section graphic can be superimposed over, cover, or otherwise visually identify the portion or portions of runway graphic 50 corresponding to the restricted section or sections of the runway. In the scenario of FIG. 2, the runway usage restriction data indicates that the approached runway is free of temporary restrictions and that a relatively large separation exists between the ownship A/C and the far end of the usable runway; consequently, such additional graphic elements are not shown on PFD 30. However, as the ownship A/C further approaches the far end of the usable runway, and/or as restrictions arise impacting the usable length of the runway, such graphics may be gradually introduced on PFD 30 in the manner described below in conjunction with FIGS. 3 and 4.

Figure 3:
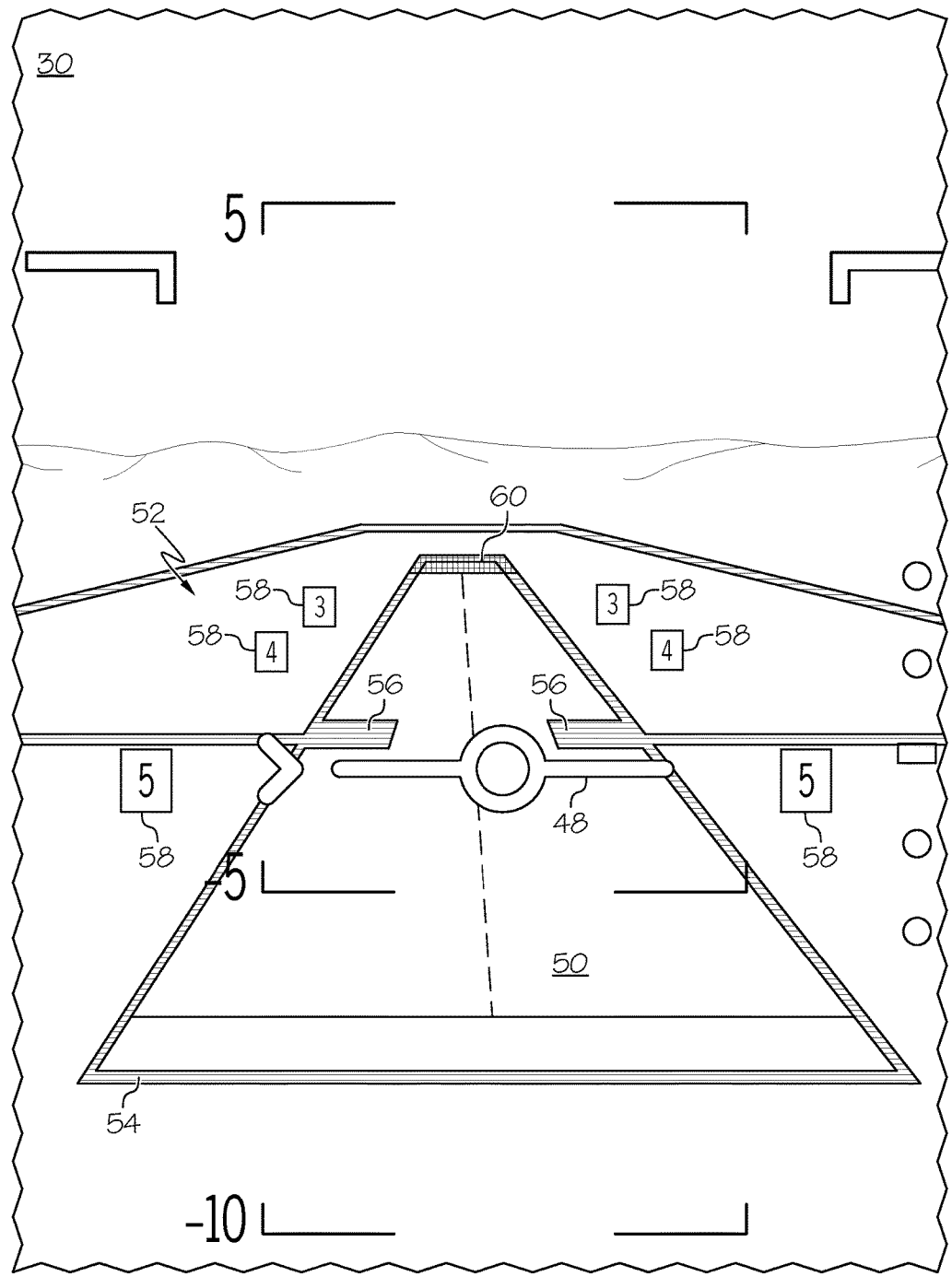
FIG. 3 is a screenshot of an exemplary PFD generated by the flight deck display system shown in FIG. 1 and including usable runway length symbology, as illustrated in a second exemplary scenario in which a section of an approached runway has been temporarily restricted in a manner effecting usable runway length.

FIG. 3 is a screenshot of a portion of PFD 30 illustrating runway graphic 50 and usable runway length symbology 52 in greater detail. In this scenario, the runway usage restriction data indicates that a section of the runway approached for usage by the ownship A/C has been rendered unavailable in a manner reducing the usable length of the runway. Accordingly, PFD 30 has been updated to include a restricted section graphic 60 overlaying a portion of runway graphic 50 corresponding to the currently restricted section of the runway. As indicated in FIG. 3, restricted section graphic 60 can be produced as a shaded region of runway graphic 50; the term "shaded" encompassing graphical overlays both patterned and solid, whether opaque or partially transparent. Even under non-alert conditions, restricted section graphic 60 may be generated in a striking color to permit graphic 60 to be visually distinguished from its surroundings on PFD 30, such as runway graphic 50 and runway border 54, at a glance. In one embodiment, and as indicated in FIG. 3 by different cross-hatching patterns, runway graphic 50 is generated in a pre-established informational color (e.g., green or blue) under non-alert conditions, while restricted section graphic 60 is generated in a pre-established caution color (e.g., amber). Furthermore, in the exemplary scenario illustrated in FIG. 3, the usable length of the runway represented by graphic 50 has been reduced due to the unavailability of the runway section corresponding to restricted section graphic 60. Thus, as may be appreciated by comparing FIG. 2 to FIG. 3, controller 12 of flight deck display system 10 has modified the appearance and/or the positioning of countdown markers 58 to reflect the reduced usable length of the runway thereby visually conveying the now-reduced runway distance available for touchdown and rollout of the ownship A/C.

Figure 4:
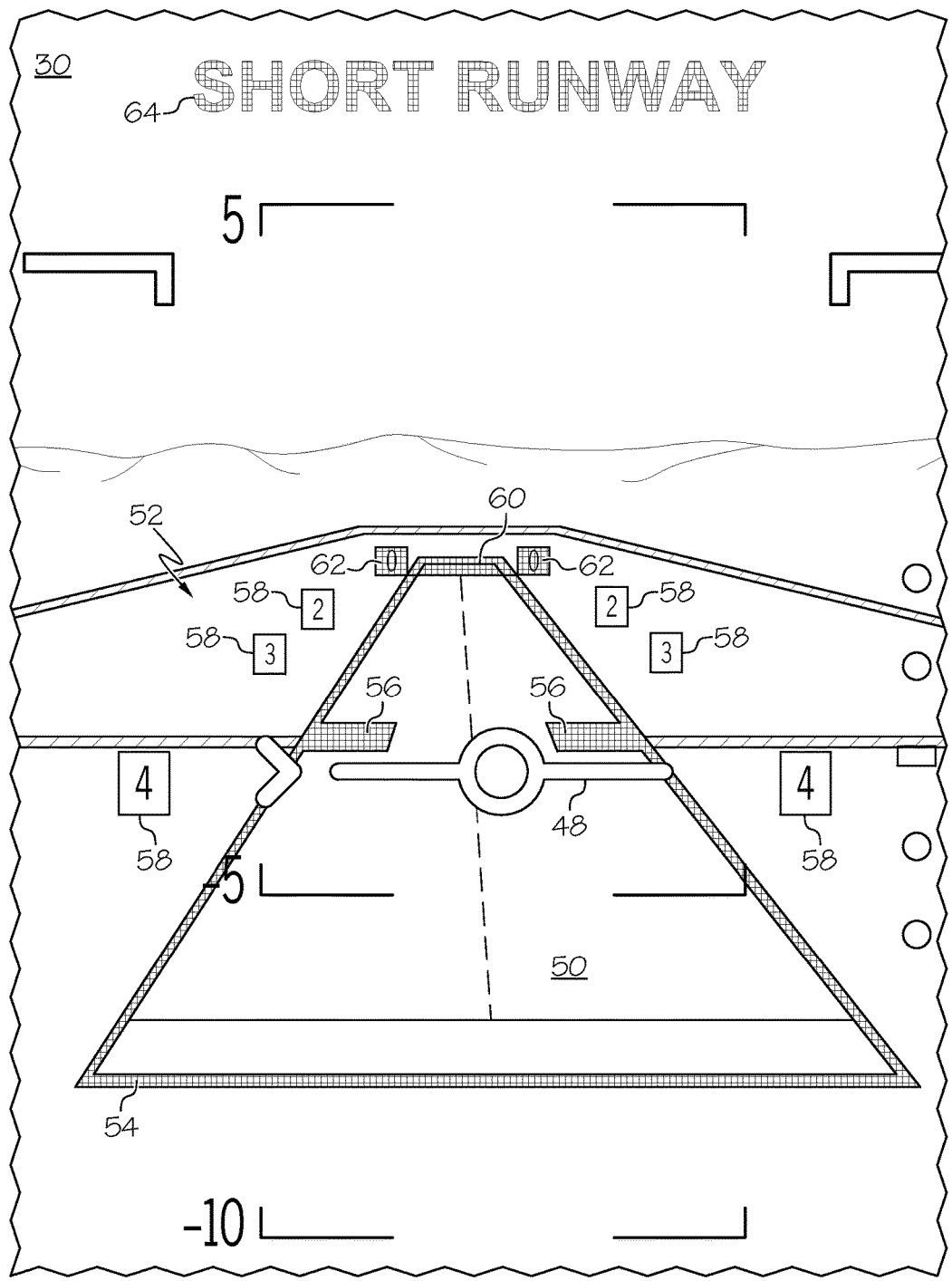
FIGS. 4 and 5 are screenshot of an exemplary PFD similar to that shown in FIG. 3 illustrating possible manners in which the appearance of the usable runway length symbology can be altered under different alert conditions.

FIG. 4 is a screenshot of a central portion of PFD 30 generated by display system 10 (FIG. 1) further illustrating symbology 52 under a different set of conditions. In this case, the runway usage restriction data now indicates that the area or length of the restricted runway section has increased relative to the scenario illustrated in FIG. 3. Controller 12 has consequently generated restricted section graphic 60 to cover or overlay a correspondingly larger portion of runway graphic 50. This expansion in the runway restricted section has effectively pushed the far end of the usable runway length closer to touchdown target 56. Controller 12 thus further generates PFD 30 to include a usable runway end marker 62. As can be seen, usable runway end marker 62 is similar to a countdown makers 58 in appearance and may include two relatively simple shapes or "boards" (e.g., squares or rectangles) positioned on opposing sides of the runway at a location corresponding to the far end of the dynamically-adjusted usable runway length. The boards of runway end marker 62 may include a numerical readout of zero (displayed as "0") to indicate that additional usable runway length is not available beyond end marker 62. Additionally, the boards of runway end marker 62 may be color coded for visual prominence or to assist in the generation of usable runway length alerts, as described more fully below. Finally, as can further been seen in FIG. 4, countdown markers 58 have again been updated or adjusted (e.g., renumbered and repositioned along the length of runway graphic 50, as appropriate) to reflect the further reduction in usable runway length resulting from the expansion of the restricted section of the runway.

In the above-described manner, controller 12 of flight deck display system 10 (FIG. 1) alters the appearance and placement of at least countdown markers 58 and usable runway end marker 62 in accordance with the current usable runway length, as derived from the latest runway usage restriction data. In addition to performing this function, controller 12 can also alter the appearance of PFD 30 and, specifically, the appearance of usable runway length symbology 52 to generate visual alerts when the runway length required for a runway flight phase approaches or exceeds the dynamically-adjusted usable runway length. Alerts of this type are generically referred to herein as "usable runway length alerts." Usable runway length alerts can include "SHORT RUNWAY" alerts, which may be produced, in a general sense, when it is determined that a relatively abbreviated acceleration or deceleration schedule is required to accomplish the runway flight phase. Usable runway length alerts can also include "REJECT TAKEOFF/LANDING" alerts or "GO AROUND" alerts in the specific case of landing, which can be generated when the dynamically-adjusted usable runway length is deemed insufficient to safely perform the landing or takeoff flight phase. The decision of when to trigger such usable runway length alerts can be made by controller 12 of flight deck display system 10 (FIG. 1) itself or by another system, whether onboard or off-board the ownship A/C, and then communicated to controller 12. In one embodiment, RAAS system 26 determines when such usable runway length alerts should be generated and provides corresponding notifications to controller 12, which then adjusts the appearance of symbology 52 generate a visual alerts on PFD 30 as described below.

The criteria by which the usable runway length alerts are generated will vary amongst embodiments. Algorithms, lookup tables, and other logic tools useful in determining when to generate such alerts are known within the industry and thus not described in detail herein. It is generally noted, however, that the usable runway length alerts may be triggered as a function of the runway length required for a given takeoff or landing flight phase (again, referred to herein as the "required runway length") relative to the sum of the current usable runway length and a predetermined buffer distance. When the usable runway length alerts are triggered in this manner, the required runway length can be determined utilizing information stored in runway database 22, current flight parameters pertaining to the ownship A/C (e.g., current energy content, wind speed, ground speed, altitude, available drag devices, and so on), runway surface conditions, weather and wind conditions, and other such conditions. The buffer distance or a range of buffer distances can be stored in memory 20 of flight deck display system 10 and recalled at the appropriate time. The buffer distance can be a fixed quantity or instead may be a variable quantity adjusted in accordance with changing runway length, as well as any number of other factors. As a still further possibility, the buffer distance can be communicated to controller 12 or RAAS 26 via datalink 14.

Controller 12 advantageously generates graded visual alerts on PFD 30, which increase in urgency as the required runway length increases relative to the currently-available usable runway length. In one implementation, controller 12 usually generates PFD 30 and usable runway length symbology 52 in a default format; alters usable runway length symbology 52 to appear in a "caution" format to generate a low level usable runway length alert; and further alters symbology 52 to appear in a "warning" format to generate a high level usable runway length alert. An example of the manner in which PFD 30 and symbology 52 may appear when generated in a default format is shown in FIG. 3. In the default format 3, runway border 54 and touchdown target 56 are generated in an informational color (represented by a first cross-hatching pattern), such as blue or green, established by a predetermined color coding scheme. Restricted section graphic 60 is further generated in a warning color (represented by a second cross-hatching pattern), such as amber, in the default format. Finally, countdown markers 58 are generated to have a noticeable, yet somewhat subtle appearance; e.g., in one embodiment, the background of each countdown marker 58 can be produced to be partially transparent, while the numeral readouts on markers 58 are generated in a non-alert color, such as white.

Returning to FIG. 4, PFD 30 is shown during generation of a low level caution alert. In this case, controller 12 of flight deck display system 10 (FIG. 1), RAAS 26, or another system has determined that the usable length of the runway exceeds the required runway length by an amount less than the buffer distance. Accordingly, a visual alert is produced on PFD 30 by generating symbology 52 in a predetermined "caution" format. In Specifically, controller 12 may generate runway border 54, touchdown target 56, restricted section graphic 60, and usable runway end marker 62 in a predetermined warning alert color (represented by a second cross-hatching pattern), such as amber, established in accordance with the color coding scheme. If desired, one or more of runway border 54, touchdown target 56, restricted section graphic 60, and usable runway end marker 62 may also be scaled upwards, redrawn to have a modified shape, or otherwise imparted with a more pronounced appearance. Additionally, if not previously labeled with the numerical readout "0," runway end marker 62 may be now be updated to include such a numerical indication. Countdown markers 58 may likewise be generated to have a more pronounced appearance; e.g., the size of countdown markers 58 can be increased, and the background of markers 58 may be rendered in a distinct opaque color, such as black. Finally, a text annunciation 64 can be generated above runway graphic 50 providing an appropriate alert message, such as "SHORT RUNWAY." If desired, haptic and/or audible alerts can also be generated in conjunction with the visual alert generated on PFD 30.

Figure 5:
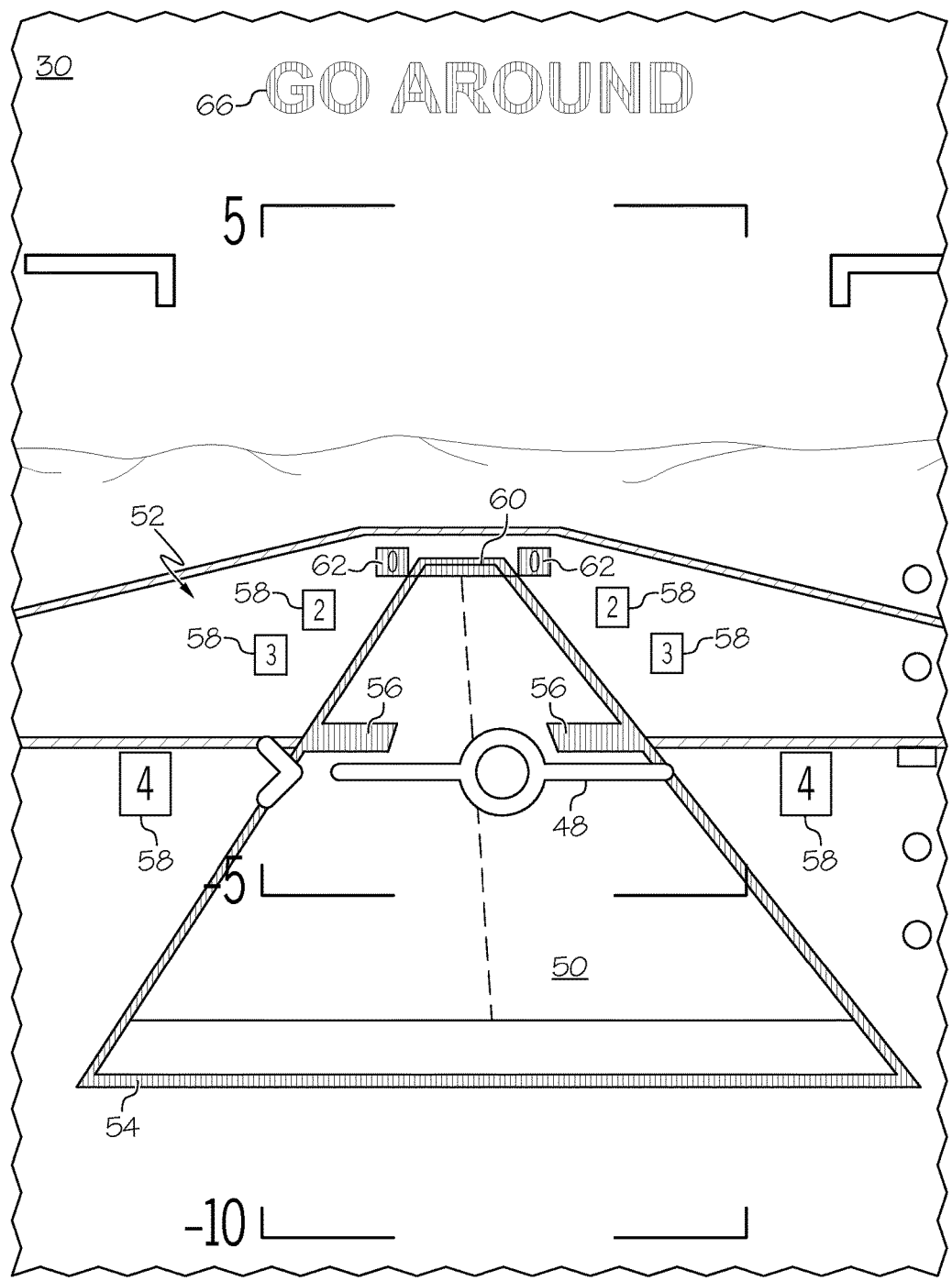

Advancing to FIG. 5, PFD 30 is shown during the generation of a high level warning alert. In this scenario, it has been determined that the usable runway length is less than the required runway length and, thus, an urgent visual alert is generated on PFD 30. This determination can made by controller 12 of flight deck display system 10 (FIG. 1) or, instead, by another system (e.g., RAAS 26 shown in FIG. 1) and communicated to controller 12. Controller 12 then updates the appearance of usable runway length symbology 52 to generate the visual warning alert in a prominent and highly noticeable manner. The warning alert can include changes in the color and/or appearance of any number of the graphical elements included within usable runway length symbology 52. For example, runway border 54, touchdown target 56, restricted section graphic 60, and usable runway end marker 62 may be generated in a red or another predetermined warning color (represented by a third cross-hatching pattern in FIG. 5). Additionally, any one or all of the previously-listed graphical elements may be generated in a larger scale, produced in a different shape, or otherwise imparted with a bold appearance. As a still further possibility, flashing or another animation effect may be applied to any or all of runway border 54, touchdown target 56, restricted section graphic 60, and end marker 62 to draw the pilot attention thereto. Lastly, a text annunciation 66 can be generated above runway graphic 50 in the upper middle portion of PFD 30. Text annunciation 66 can provide an appropriate, high urgency alert message, such as "GO AROUND" or "REJECT LANDING ATTEMPT." Corresponding haptic and/or audible alert can be generated in conjunction with the visual alert generated on PFD 30, as desired.

The foregoing has thus provided embodiments of a flight deck display system and method for generating cockpit displays including symbology indicative of usable runway length, as dynamically adjusted to reflect runway section restrictions and closures as they arise. Embodiments of the above-described flight deck display system determine when a section of a runway has been rendered temporarily or permanently unavailable and dynamically adjust the displayed symbology in accordance with any reductions in usable runway length resulting from the reported runway use restrictions. In so doing, the flight deck display system can better apprise a pilot of the usable runway length in a manner reflective of real world runway conditions as they presently exist. Additionally, embodiments of the above-described flight deck display system can generate alerts of varying urgency to further notify a pilot when the dynamically-adjusted usable runway length approaches or exceeds the runway length required for takeoff or landing, as calculate by the flight deck display system. In this manner, the flight deck display system can enhance situational awareness and pilot decision making during landing and takeoff procedures in instances wherein usable runway length is impacted by temporary runway section restrictions or closures. While the foregoing description primarily focused on the landing flight phase in describing the display system and usable runway length symbology, it is emphasized that the flight deck display system can also generate such symbology during the takeoff phase of flight. In this case, the usable runway length symbology can be similar or substantially identical to that described above in conjunction with FIGS. 2-5 with slight modifications appropriate for takeoff procedures. For example, during generation of the high level warning alert shown in FIG. 5, text annunciation or message 66 can be replaced with a different text message appropriate for the takeoff phase, such as "REJECT TAKEOFF ATTEMPT."

In one embodiment, the flight deck system dynamically repositions the countdown or distance remaining markers along the runway based on the information provided by flight crew, a NOTAM system, or another system reporting available landing distance changes. When a section of a runway is rendered temporarily unavailable, the corresponding section of the runway may be highlighted change the appearance of the section, such as by highlighting the section in a predetermined caution color (e.g., amber). Furthermore, when a landing distance alert or another runway usage length alert is issued, the countdown markers (e.g., virtual signs with numerical readouts) can be rendered at a correct location with enhanced appearances in color or shape change to highlight the alert condition.

Although an exemplary embodiment of the present invention has been described above in the context of a fully-functioning computer system (e.g., flight deck display system 10 described above in conjunction with FIG. 1), those skilled in the art will recognize that the mechanisms of the present invention are capable of being distributed as a program product and, furthermore, that the teachings of the present invention apply to the program product regardless of the particular type of computer-readable media (e.g., floppy disc, hard drive, memory card, optical disc, etc.) employed to carry-out its distribution. In certain implementations, the flight deck display system may comprise graphical user interface (e.g., ARINC 661) components, which may include a user application definition file ("UADF"). As will be appreciated by one skilled in the art, such a UADF is loaded into the flight deck display system and defines the "look and feel" of the display, the menu structure hierarchy, and various other static components of the graphic user interface.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight deck display system for deployment onboard an aircraft, the flight deck display system comprising:
 a display device on which a cockpit display is generated including a runway graphic representative of a runway approached for usage by the aircraft and including a usable runway end marker; and
 a controller operably coupled to the display device and configured to:
  determine a dynamically-adjusted usable runway length as a function of runway usage restriction data identifying a restricted section of the runway approached for usage by the aircraft; and
  adjust a position of the usable runway end marker, as generated on the cockpit display, along a length of the runway graphic in accordance with the dynamically-adjusted usable runway length.

2. The flight deck display system of claim 1 wherein the controller is further configured to generate the cockpit display to include a restricted section graphic overlaying a portion of the runway graphic corresponding to the restricted section.

3. The flight deck display system of claim 2 wherein the controller generates the restricted section graphic as a shaded region of the runway graphic.

4. The flight deck display system of claim 1 wherein the controller is further configured to generate the cockpit display to include countdown markers positioned at predetermined intervals alongside the runway graphic, the countdown markers indicating a distance to the usable runway end marker as adjusted in accordance with the dynamically-adjusted usable runway length.

5. The flight deck display system of claim 1 wherein the controller is further configured to selectively produce caution and warning alerts on the cockpit display by generating at least the usable runway end marker in caution and warning formats, respectively.

6. The flight deck display system of claim 5 further comprising a Runway Awareness and Advisory System coupled to the controller, the controller selectively generating the caution and warning alerts in accordance with data received from the Runway Awareness and Advisory System.

7. The flight deck display system of claim 5 wherein the controller is configured to:
generate the caution alert when a runway length required by the aircraft for a runway flight phase exceeds the dynamically-adjusted usable runway length by an amount less than a predetermined buffer distance; and
generate the warning alert when the runway length required by the aircraft for the runway flight phase is less than the dynamically-adjusted usable runway length.

8. The flight deck display system of claim 1 further comprising a datalink coupled to the controller, the controller configured to receive the runway usage restriction data from a remote reporting source via the datalink.

9. The flight deck display system of claim 8 wherein the controller is configured to extract the runway usage restriction data from a digital Notice to Airmen received via over datalink.

10. A flight deck display system for deployment onboard an aircraft, the flight deck display system comprising:
a display device on which a Primary Flight Display (PFD) is generated including a runway graphic representative of a runway approached for usage by the aircraft; and
a controller operably coupled to the display device, the controller configured to:
receive runway usage restriction data identifying a currently restricted section of the runway approached for usage by the aircraft, produce a restricted section graphic visually identifying a portion of the runway graphic corresponding to the currently restricted section of the runway, the restricted section graphic comprising a shaded region of the runway graphic.

11. The flight deck display system of claim 10 wherein the controller is further configured to generate the PFD to include countdown markers positioned at predetermined intervals alongside the runway graphic.

12. The flight deck display system of claim 10 wherein the controller is further configured to:
determine a current usable runway length as a function of the runway usage restriction data; and
generate a usable runway end marker visually identifying a location along the runway at which the current usable runway length ends.

13. The flight deck display system of claim 12 wherein the controller is further configured to generate the usable runway end marker in a predetermined informational color and the restricted section graphic in a predetermined caution color when the current usable runway length exceeds by a required runway length by an amount equal to or greater than a predetermined buffer distance.

14. The flight deck display system of claim 13 wherein the controller is further configured to generate the usable runway end marker and the restricted section graphic in a predetermined caution color when the required runway length exceeds the current usable runway length by an amount less than the predetermined buffer distance.

15. The flight deck display system of claim 14 wherein the controller is further configured to generate the usable runway end marker and the restricted section graphic in a predetermined warning color when the required runway length is less than the current usable runway length.

16. A method carried-out by a flight deck display system of an aircraft, the flight deck display system including a controller and a display device operably coupled to the controller, the method comprising:
at the controller, receiving runway usage restriction data identifying a restricted section of a runway approached for usage by the aircraft;
at the controller, determining a dynamically-adjusted usable runway length as a function of the runway usage restriction data; and
on the display device, generating a runway graphic and a usable runway end marker such that a position of the usable runway end marker along a length of the runway graphic visually identifies the dynamically-adjusted usable runway length.

17. The method of claim 16 further comprising:
at the controller,
generating a restricted section graphic on the display device overlaying a portion of the runway graphic corresponding to the restricted section of the runway.

18. The method of claim 17 further comprising varying an appearance of the usable runway end marker and the restricted section graphic to generate a visual alert on the display device.

19. The method of claim 16 further comprising generating countdown markers on the display device at predetermined intervals alongside the runway graphic, the countdown markers indicating a distance to the usable runway end marker as adjusted in accordance with the dynamically-adjusted usable runway length.

* * * * *